United States Patent [19]

Chapdelaine

[11] 4,177,405
[45] Dec. 4, 1979

[54] PHOTOCELL-CONTROLLED LIGHTING SYSTEM

[76] Inventor: Martial Chapdelaine, 2667, rue Prévert, Longueuil, Quebec, Canada, J4L 1T8

[21] Appl. No.: 903,167

[22] Filed: May 5, 1978

[51] Int. Cl.² ............... H05B 37/02; H05B 39/02
[52] U.S. Cl. ...................... 315/159; 250/206; 315/154; 315/313; 315/360; 361/173
[58] Field of Search .............. 315/149, 152–154, 315/159, 313, 323, 360, 362; 250/206, 214 AL, 214 R; 361/173, 175

[56] References Cited

U.S. PATENT DOCUMENTS

| | | | |
|---|---|---|---|
| 2,914,709 | 11/1959 | Rabinow | 250/214 R X |
| 3,428,861 | 2/1969 | Zinsmeyer | 315/159 |
| 3,430,052 | 2/1969 | Stephan | 361/173 X |
| 3,886,352 | 5/1975 | Lai | 315/360 X |

Primary Examiner—Eugene R. La Roche

[57] ABSTRACT

A photocell-controlled lighting system is disclosed. The system comprises a first photocell-controlled operated by a photocell, at least one night or decorative light adapted to be connected to a power source, at least one spotlight, also adapted for connection to the power source, a second relay adapted for connection to the power source and responsive to energization of the photocell-controlled relay for energizing the night or decorative light and to de-energization of the photocell-controlled relay when the photocell is illuminated by the lights of an automobile entering the driveway of a house for switching off the night or decorative light, and a third time relay adapted for connection to the power source and operated by the second relay when the lights of the automobile are switched off for switching of the spotlight for a predetermined time interval.

7 Claims, 1 Drawing Figure

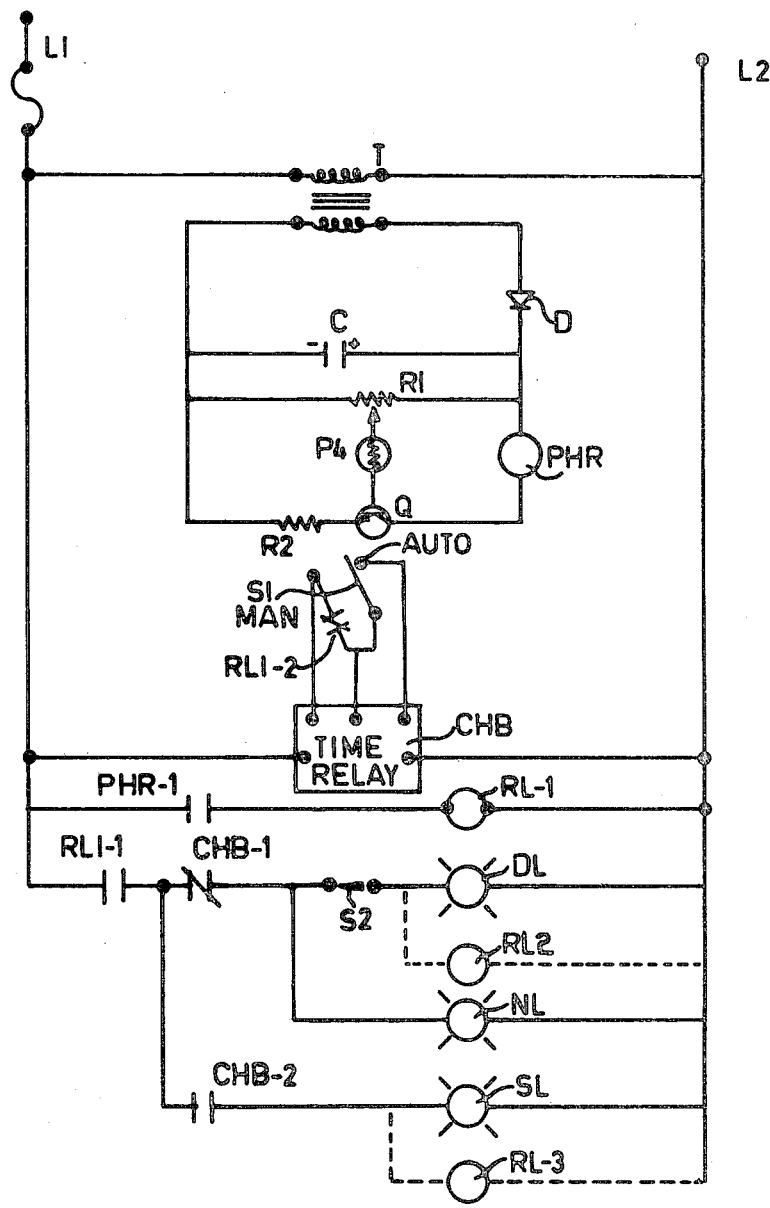

PHOTOCELL-CONTROLLED LIGHTING SYSTEM

This invention relates to a photocell-controlled system for energizing night or decorative lights which also additionally controls energization of spotlights for a predetermined period of time when a vehicle enters a driveway of a house.

BACKGROUND OF THE INVENTION

It is generally known to energize night or decorative lights around a house by means of photocells which automatically switch the lights on at sunset and off at sunrise. Light energized photocell-controlled relays are also available and could be used to energize spotlights when illuminated by the lights of an automobile shining on them. However, the installation of both sets of controls would require a large number of electrical components which would normally render such a system too expensive.

SUMMARY OF THE INVENTION

It is therefore the object of the present invention to provide a photocell-controlled lighting system which is capable of energizing both the night or decorative lights, and also the spotlights of a house for short time interval, using simple and inexpensive control circuitry.

The photocell-controlled lighting system, in accordance with the invention, comprises a first photocell-controlled relay operated by a photocell, at least one night or decorative light adapted to be connected to a power source, at least one spotlight, also adapted for connection to the power source, a second relay adapted for connection to the power source and responsive to energization of the photocell-controlled relay for energizing the night or decorative light and to de-energization of the photocell-controlled relay when the photocell is illuminated by the lights of an automobile entering the driveway of a house for switching off the night or decorative lights, and a third time relay for connection to the power source and operated by the second relay when the lights of an automobile are switched off for switching on the spotlight for a predetermined time interval.

The photocell-controlled lighting system may comprise a photocell control circuit for energizing the photocell-controlled relay. Such control circuit comprises a low voltage transformer connected to the voltage source, a rectifier connected to the output of the transformer, a dark energized photocell, and a transistor circuit connected to the output of the rectifier and responsive to the photocell for energization of the photocell-controlled relay.

In a preferred embodiment of the invention, the photocell-controlled relay has a set of normally open contacts and the second relay is connected in series with such set of normally open contacts across the power source. The second relay has a first set of normally open contacts in series with the night or decorative light and with said spotlight, and a second set of normally closed contacts associated with the time relay. The time relay has a set of normally closed contacts in series with the night or decorative light and a set of normally open contacts in series with the spotlight. The time relay is a relay which is instantaneously energized when an external control switch is operated to close two of its terminals. When such switch is released, timing action begins and further relay contacts will not release until the end of the delay period. The set of normally closed contacts of the second relay acts as the above switch and instantaneously closes the above terminals of the time relay upon de-energization of the second relay by the lights of the car. The delay period starts when the second relay is re-energized to open the contacts across the above terminals when the lights of the car are switched off.

Additional relays may also be provided in parallel with the decorative light and the spotlight for operating additional lights if there are too many for the power than can be handled by the circuit.

SHORT DESCRIPTION OF THE DRAWING

The invention will now be disclosed, by way of example, with reference to a preferred embodiment of a photocell-controlled lighting system illustrated in the accompanying drawing, in which the only FIGURE illustrates a circuit diagram of the light system in accordance with the invention.

BRIEF DESCRIPTION OF AN EMBODIMENT OF THE INVENTION

Referring to the drawing, power from 120-volt source is applied across terminals L1 and L2 through a fuse F. The photocell-controlled circuit is powered by a transformer T, which steps down the input voltage to 6 volts. The transformer has a primary winding connected across terminals L1 and L2 and a secondary winding connected in series with a half-wave rectifier circuit including a diode D and a variable resistor R1. A catalytic capacitor C is connected across resistor to smooth the DC output of the rectifier in known manner. A photocell-controlled relay PHR is connected in series with the emittor and connector electrodes of a transistor Q and a fixed resistor R2 across the output of the rectifier circuit. Operation of the transistor and the subsequent energization of relay PHR is controlled by a photocell PH connected between the variable tap of resistor R1 and the base of the transistor. Variable resistor R1 controls the sensitivity of the photocell and is adjusted by the owner of the house to operate the relay PHR at a predetermined darkness level and release it at a predetermined light level.

A timing relay CHB is connected across terminals L1 and L2. Timing relay CHB is provided with a set of normally closed contacts CHB-1 and a set of normally open contacts CHB-2. A relay RL1 is also connected across terminals L1 and L2 through normally open contacts PHR-1 of relay PHR. Relay RL1 is provided with a set of normally open contacts RL1-1 and a set of normally closed contacts RL1-2.

Relay CHB is a relay which provides a predetermined delay on release. An example of such relay is one sold by Potter and Brumfier, under Ser. No. CHB 3870013. The relay is instantaneously de-energized when a control switch is operated to connect two external terminals. When the control switch is returned to its original position, timing action begins and the relay contacts will not release until the end of the delay period. In the present invention, energization of the relay CHB is controlled by contacts RL1-2 of relay RL1, as it will be disclosed later. De-energization of the relay CHB may also be controlled by a manual switch S1 in position MAN.

A number of decorative lights, illustrated by light DL, are connected in series with normally open contacts RL1-1 of relay RL, normally closed contacts CHB-1 of relay CHB, and manual switch S2 across lines L1 and L2. Switch S2 is used to switch off the decorative light at a predetermined time of the night, such as before going to bed. If a larger number of decorative lights that can be safely connected across lines L1 and L2 is required, a relay RL2 is connected across the decorative lights DL and the contacts of such relay connected in the energization circuit of additional decorative lights.

A number of night lights, illustrated by light NL, are also connected in series with normally open contacts RL1-1 of relay RL1 and normally closed contacts CHB-1 of relay CHB across lines L1 and L2.

A number of spotlights, illustrated by spotlight SL, are connected in series with normally open contacts RL1-1 of relay RL1 and normally open contacts CHB-2 of relay CHB across lines L1 and L2. If a larger number of spotlights S1 that can be safely connected across lines L1 and L2 is required, a relay R13 is connected across the spotlights S1 and the contacts of such relay connected in the energization circuit of additional spotlights.

The above disclosed lighting system operates as follows.

Energization of the photocell, when it is dark, will render transistor Q conductive to operate relay PHR. The energization of relay PHR will close contacts PHR-1 to energize relay RL1. The operation of relay RL1 will close contacts RL1-1 and open contacts RL1-2. Assuming that switch S2 is closed, the decorative lights and the night lights will be energized. If a relay RL2 is provided to energize additional lights, these lights will also be energized.

When the driver of a vehicle enters the driveway of the house, at night, the lights of the vehicle will shine on photocells PH (suitably located) and momentarily de-energize relay PHR which, in turn, by opening its contact PHR-1, will de-energize relay RL1. The release of contacts RL-1 of relay RL1 will extinguish all the decorative and night lights. The release of relay RL1 will also close contacts RL1-2 in the control circuit of time relay CHB and operate this relay. The operation of relay CHB will open contacts CHB-1 and close contacts CHB-2. When the lights of the car are extinguished, the photocell senses darkness and relay PHR is re-operated, thereby reclosing its contacts PHR-1 and re-operating relay RL1. The re-operation of relay RL1 will close contact RL1-1, since contacts CHB-2 are now closed, the spotlights SL will be energized. If a relay RL3 is provided to energize additional spotlights, this relay will also be operated. The operation of relay RL1 also opens contacts RL1-2 to initiate the timing action of relay CHB. After a predetermined time period, which depends on the relay used and may be typically up to 180 seconds, relay CHB will release its contacts CHB-2 to switch off the spotlights and close its contacts CHB-1 to energize the night and decorative lights.

Although the invention has been disclosed with reference to a preferred embodiment, it is to be understood that various modifications may be made to such embodiment and that the invention is not limited by the described embodiment but by the claims only. For example, other circuitry than the above disclosed low voltage transistorized control circuit could be used for energizing the photocell control relay. Also, other types of time relays could also be used.

What I claim is:
1. A photocell-controlled lighting system comprising:
   (a) a first photocell-controlled relay operated by a photocell;
   (b) at least one night or decorative light adapted to be connected to a power source;
   (c) at least one spotlight also adapted for connection to said power source;
   (d) a second relay adapted for connection to said power source and responsive to energization of said photocell-controlled relay for energizing said night or decorative light, and to de-energization of said photocell-controlled relay when the photocell is illuminated by the lights of an automobile entering the driveway of a house for switching off said night or decorative light; and
   (e) a third time relay adapted for connection to said power source and operated by said second relay when the lights of the automobile are switched off for switching on said spotlight for a predetermined time interval.

2. A photocell-controlled lighting system as defined in claim 1, further comprising a photocell control circuit for energizing said photocell-controlled relay, said photocell control circuit comprising a low voltage transformer connected to the voltage source, a rectifier connected to the output of said transformer, a dark energized photocell, and a transistor circuit connected to the output of said rectifier circuit and responsive to said photocell for energization of said photocell-controlled relay.

3. A photocell-controlled lighting system as defined in claim 1, wherein said photocell-controlled relay has a set of normally open contacts and wherein said second relay is connected in series with said set of normally open contacts across said source.

4. A photocell-controlled lighting system as defined in claim 1, wherein said second relay has a first set of normally open contacts in series with said night or decorative light and with said spotlight, and a second set of normally closed contacts associated with said time relay.

5. A photocell-controlled lighting system as defined in claim 4, wherein said time relay has a set of normally closed contacts in series with said night or decorative light and a set of normally open contacts in series with said spotlight.

6. A photocell-controlled relay as defined in claim 5, wherein said time relay is switched on by the release of the set of normally closed contacts of said second relay and remains on for said predetermined time period after the set of normally closed contacts of the second relay is operated by the re-energization of the second relay when the lights of the automobile are switched off.

7. A photocell-controlled lighting system as defined in claim 1, further comprising a manual switch in series with said night or decorative light for allowing de-energization of said light, when desired.

* * * * *